ated Jan. 19, 1965

3,166,471
POLYAMINE-QUATERNARY NITROGEN ALGICIDAL COMPOSITION
Joseph R. Gump, Alma, and Lionel Dale McCowen, St. Louis, Mich., assignors to Michigan Chemical Corporation
No Drawing. Filed Aug. 22, 1960, Ser. No. 50,839
17 Claims. (Cl. 167—33)

This invention relates to an algicidal composition and more particularly to a composition comprising two different algicides which in combination have a synergistic action which causes the mixture to be more effective than either of its essential components.

It is frequently necessary to prevent the growth of algae or to periodically destroy algae growths in the water of swimming pools, water used in cooling towers and condensers, water supply ponds, lakes, drainage and irrigation ditches, boiler water, water used in air conditioning systems and in other bodies of water, for various reasons determined by the use of the water. For example, in swimming pools algae growths cause the water to be cloudy and the bottom of the pool to be slimy. Such growths in swimming pools are generally undesirable from an esthetic standpoint, although they are harmless to the swimmers. However, they interfere with the maintenance of the water in an acceptable sanitary condition, since the algae growths consume the chemicals, such as, chlorine or bromine, which are required to keep the bacteria count of the water at an acceptable sanitary level.

It is an object of this invention to provide an algicidal composition which is highly effective at low concentrations in destroying and preventing algae growths in water.

A further object is to provide an algicidal composition that is effective in preventing algae growths in swimming pools at low concentrations which are entirely unobjectionable to swimmers.

Another object is to provide an algicidal composition which readily dissolves in water and which is non-flammable and requires no special precautions in handling and shipment.

Other objects of this invention and its various advantageous features will become apparent from the detailed description of this invention which follows:

The algicidal composition in accordance with this invention comprises essentially the combination of an organic polyamine which has at least two and not more than eight carbon atoms and at least two and not more than five nitrogen atoms in its molecule and a water-soluble quaternary nitrogen compound which, when in a solution of water, produces a cation having the following formula:

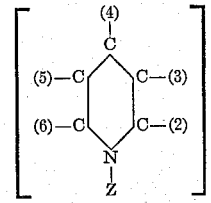

in which (2), (3), (4), (5) and (6) are either hydrogen atoms or lower alkyl groups containing not more than four carbon atoms, and Z is a saturated or unsaturated aliphatic group which has at least fourteen and not more than twenty carbon atoms. Thus, the basic ring of this quaternary nitrogen compound may be an unsubstituted pyridine ring, or it may be a pyridine ring substituted at one of its (2)–(6) positions or more than one with a methyl, ethyl, propyl or butyl group. The propyl group or the butyl group which may form a substituent of this compound may be either a straight or branch chain group.

The quaternary nitrogen compound which is included in this composition may be any one or a mixture of the following compounds:

Cetyl alpha-picolinium bromide
Cetyl alpha-picolinium chloride
Myristyl alpha-picolinium bromide
Myristyl alpha-picolinium chloride
Stearyl alpha-picolinium bromide
Stearyl alpha-picolinium chloride
Oleyl alpha-picolinium bromide
Oleyl alpha-picolinium chloride
Linoleyl alpha-picolinium bromide
Linoleyl alpha-picolinium chloride
Linolenyl alpha-picolinium bromide
Linolenyl alpha-picolinium chloride
Cetyl 2,6-lutidinium bromide
Cetyl 2,6-lutidinium chloride
Myristyl 2,6-lutidinium bromide
Myristyl 2,6-lutidinium chloride
Stearyl 2,6-lutidinium bromide
Stearyl 2,6-lutidinium chloride
Oleyl 2,6-lutidinium bromide
Oleyl 2,6-lutidinium chloride
Linoleyl 2,6-lutidinium bromide
Linoleyl 2,6-lutidinium chloride
Linolenyl 2,6-lutdinium bromide
Linolenyl 2,6-lutidinium chloride
Cetyl pyridinium bromide
Cetyl pyridinium chloride
Myristyl pyridinium bromide
Myristyl pyridinium chloride
Stearyl pyridinium bromide
Stearyl pyridinium chloride
Oleyl pyridinium bromide
Oleyl pyridinium chloride
Linoleyl pyridinium bromide
Linoleyl pyridinium chloride
Linolenyl pyridinium bromide
Linolenyl pyridinium chloride
Cetyl 4-ethyl pyridinium bromide
Cetyl 4-ethyl pyridinium chloride
Myristyl 4-ethyl pyridinium bromide
Myristyl 4-ethyl pyridinium chloride
Stearyl 4-ethyl pyridinium bromide
Stearyl 4-ethyl pyridinium chloride
Oleyl 4-ethyl pyridinium bromide
Oleyl 4-ethyl pyridinium chloride
Linoleyl 4-ethyl pyridinium bromide
Linoleyl 4-ethyl pyridinium chloride
Linolenyl 4-ethyl pyridinium bromide
Linolenyl 4-ethyl pyridinium chloride
Cetyl 4-n-propyl pyridinium bromide
Cetyl 4-n-propyl pyridinium chloride
Myristyl 4-n-propyl pyridinium bromide
Myristyl 4-n-propyl pyridinium chloride
Stearyl 4-n-propyl pyridinium bromide
Stearyl 4-n-propyl pyridinium chloride
Oleyl 4-n-propyl pyridinium bromide
Oleyl 4-n-propyl pyridinium chloride
Linoleyl 4-n-propyl pyridinium bromide
Linoleyl 4-n-propyl pyridinium chloride
Linolenyl 4-n-propyl pyridinium bromide
Linolenyl 4-n-propyl pyridinium chloride The foregoing compounds are either chlorides or bromides. Alternatively, we may use the corresponding iodides, fluorides, or nitrates, or other water-soluble counterparts of these compounds, in the composition. Our research has shown that it is the cation of the compounds of this class which have the algicidal action. Therefore, the particular anion of the compound is unimportant, provided the compound is water-soluble and the anion itself offers no objectionable properties in the particular use which is to be made of the composition. Thus, the fluorides may be included in the composition when it is to be used for the treatment of industrial water, but are not suitable for inclusion in the composition when it is intended to be used in swimming pool water, since the fluoride ion is toxic.

Of these various compounds we prefer to use the cetyl picolinium bromides or chlorides, since they are exceedingly active in the destruction of algae, when in admixture with an organic polyamine and they are readily synthesized. From an economic standpoint, the cetyl mixed picolinium bromide or chloride, consisting of a mixture of cetyl $\beta$-picolinium bromide or chloride, and cetyl $\gamma$-picolinium bromide or chloride is preferred, since a mixture of $\beta$-, and $\gamma$-picolines is a cheaper raw material for the preparation of the compound than the pure isomers. As will be shown hereinafter, the mixture is as effective an algicide as the pure compounds.

The organic polyamine which is the object of the two essential components of this composition may be, for example, aminoethyl ethanolamine, ethylene diamine, diethylene triamine, triethylene tetramine, tetraethylene pentamine, propane diamine, hexane diamine, hexamethylene tetramine, or an imidazoline. The imidazoline may for example, be of high molecular weight, such as, for example, "Amine C" having a molecular weight of 276, "Amine O" having a molecular weight of 355, or "Amine S" having a molecular weight of 360, which are produced by Geigy Chemical Company.

Of these various polyamines, we prefer to use aminoethyl ethanolamine, although hexamethylene tetramine, propane diamine, diethylene triamine and tetraethylene pentamine are also particularly well suited for inclusion in the composition.

In addition to the combination of the organic polyamine and the quaternary nitrogen compound, the composition in accordance with this invention will desirably include a monohydric alcohol or a ketone, to render it more readily dispersible in water which is to be treated. The monohydric alcohol may contain from one to six carbon atoms and may be a primary, secondary, or tertiary alcohol. The ketone which may be used, may contain from three to six carbon atoms.

The boiling point and the solvent action of the isopropanol for the quaternary nitrogen compound and the organic polyamine of the composition makes it particulary suitable for use as a component thereof. The composition may also include a polyhydric alcohol and water to render it non-flammable. The polyhydric alcohol in the presence of the monohydric alcohol acts as a solvent in the composition, as well as rendering the composition non-flammable. The readiness with which the composition disperses in water increases as the proportion of the monohydric alcohol is increased and that of the polyhydric alcohol is decreased. However, an increase in the monohydric alcohol content above about 20%, by weight, causes the product to be flammable and is not required to obtain satisfactory dispersibility.

Embodiments of the composition of this invention in which a ketone is used instead of a monohydric alcohol are useful in the treatment of water in which the toxicity of the ketone itself is of no consequence. Ketones which are suitable for use in this composition are, for example, dimethyl ketone, ethylmethyl ketone, diethyl ketone and methyl isobutyl ketone.

Preferred embodiments of the composition in accordance with this invention are illustrated by Table I.

TABLE I

*Preferred algicidal formulations*

| Ingredient: | Percentage by weight |
|---|---|
| Cetyl mixed picolinium bromide | 48.0–65 |
| Aminoethyl ethanolamine | 1.0–10 |
| Diethylene glycol | 1.0–18 |
| Isopropanol | 10.0–35.0 |
| Water | 1.0–25 |

Compositions within the percentage ranges given by Table I are satisfactory from the standpoint of volatility, solubility, dispersibility in water, and cost. Those which contain not more than about 20% isopropanol are not flammable and are desirable in that respect.

The compositions in accordance with this invention are effective at low concentration for the control of all the common species of algae, including, Chlorella sp., *Chlorella variegata, Scenedesmus quadricauda*, Scenedesmus obliquus and Nostoc sp., as well as in the control of Phormidium sp. (black algae), species which have been found to have unusually high resistance to commercial algicides now available.

Table II presents comparative algicidal tests against the algae Chlorella sp. with compositions in accordance with this invention, a commercially available algicide and the picolinium bromides alone.

TABLE II

*Comparative algicidal tests against Chlorella sp. at concentrations of 2 p.p.m. of the active algicidal ingredient or ingredients of the composition*

| Examples | 1 | 2 | 3 | 4 | 5 | 6 | 7 | 8 |
|---|---|---|---|---|---|---|---|---|
| Composition in Percent by Weight: | | | | | | | | |
| Commercial Algicide A (61.9—active) | 100 | | | | | | | |
| Cetyl $\alpha$-picolinium bromide | | 100 | | | | | | |
| Cetyl $\beta$-picolinium bromide | | | 100 | | | | | |
| Cetyl $\gamma$-picolinium bromide | | | | 100 | | | | |
| Cetyl mixed picolinium bromides | | | | | 100 | | 64.3 | 60.0 |
| Aminoethyl ethanolamine | | | | | | 100.0 | 3.6 | |
| Hexamethylene tetramine | | | | | | | | 2.0 |
| Isopropanol | | | | | | | 21.4 | 20.0 |
| Algicidal Test Results: Number of days of complete control of Chlorella sp | 8 | 13 | 16 | 16 | 16 | 5 | 29.0 | 21.0 |

Table II clearly demonstrates the synergistic action of the combination of cetyl mixed picolinium bromide with aminoethylethanolamine or hexamethylene tetramine, as well as the superiority of the compositions in accordance with this invention over prior art compositions.

Referring specifically to the data of Table II, it will be seen that the commercial product designated "Algicide A" gave complete control of the algae Chlorella sp. for a period of eight days after a dosage of two parts per million of its active ingredient. This particular product is widely recognized as a superior algicide and has been shown by our own tests to be the most effective, commercially available product which we have been able to locate.

As compared with the thirteen days of complete control afforded by "Algicide A," as will be noted from the data of Table II that the cetyl $\alpha$-picolinium bromide, cetyl $\beta$-picolinium bromide and cetyl $\gamma$-picolinium bromide gave complete controls of 13, 16 and 16 days respectively, while the cetyl mixed picolinium bromide gave complete control for a period of 16 days. Thus, each of these materials were superior to the commercial "Algicide A" by a wide margin and the cetyl mixed picolinium bromide was as good as the more expensive pure cetyl picolinium bromides.

Still referring to the data of Table II it will be seen that aminoethyl ethanolamine showed some algicidal activity giving a complete control of the algae for somewhat less than five days, as compared with complete control given by the cetyl mixed picolinium bromide for a period of sixteen days. The admixture of the cetyl mixed picolinium bromide with the aminoethyl ethanolamine of Example 7 gave a complete control of the algae for a period of twenty-nine days. Thus, the substitution of a material, the aminoethyl ethanolamine, which was only mildly effective as an algicide (5 days) for a portion of the highly active cetyl mixed picolinium bromide (16 days) resulted in a mixture which gave the highly effective control of twenty-nine days. This is a definite synergism, for which we have no theoretical explanation. However, we have found that it is generally shown by mixtures of the quaternary nitrogen compounds of the class hereinbefore disclosed with the organic polyamines. This is illustrated by Example 8 of Table II, in which hexamethylene tetramine is the organic polyamine admixed with the cetyl mixed picolinium bromide. Although not shown by the data of Table II, the algicidal activity of hexamethylene tetramine is less than that of aminoethyl ethanolamine, yet the mixture of hexamethylene tetramine with cetyl mixed picolinium bromide gave a more effective algicidal action (21 days) than that of the cetyl mixed picolinium bromide itself (16 days).

Table III presents a comparison of the effectiveness of illustrative examples of compositions in accordance with this invention which contain different ratios of cetyl mixed picolinium bromide and aminoethyl ethanolamine or hexamethylene tetramine, with that of two well known commercial algicides, in the control of the algae Chlorella sp. when at concentrations which provide two parts per million of the active ingredients.

TABLE III

*Algicidal tests against Chlorella sp. using cetyl mixed picolinium bromide formulations containing various amounts of polyamines, at concentrations of 2 p.p.m. of the active algicilad ingredients of the composition*

| Example No. | 9 | 10 | 15 | 13 | 12 | 11 | 14 | 16 | 17 |
|---|---|---|---|---|---|---|---|---|---|
| Composition in Percent by Weight: | | | | | | | | | |
| Commercial Algicide "A" (61.9% Active) | 100 | | | | | | | | |
| Commercial Algicide "B" (50% Active) | | 100 | | | | | | | |
| Cetyl mixed picolinium bromide | | | 60.6 | 60.6 | 60.6 | 60.6 | 60.6 | 60.6 | 60.6 |
| Aminoethyl ethanolamine | | | 5.9 | 3.9 | 3.2 | 2.0 | 4.7 | | |
| Hexamethylene tetramine | | | | | | | | 3.9 | 11.8 |
| Isopropanol | | | 23.6 | 23.6 | 23.6 | 23.6 | 23.6 | 17.7 | 7.9 |
| Diethylene glycol | | | | 2.0 | 2.7 | 3.9 | 1.2 | | |
| Water | | | 9.9 | 9.9 | 9.9 | 9.9 | 9.9 | 17.8 | 19.7 |
| Algicidal Test: Number of Days of Complete Control | 9 | 17 | 43 | 35 | 36 | 23 | 43 | 31 | 41 |

It will be seen from the data of Table II that each of the compositions in accordance with this invention, shown as Examples 11–17, inclusive, are definitely more effective in the control of the algae Chlorella sp. than either of the commercial algicides "A" or "B" of Examples 9 and 10. Further, it is to be noted from Examples 11–15 that as the proportion of aminoethyl ethanolamine is increased from 2.0 parts, by weight, to 4.7 parts, by weight, the effectiveness of the algicide increases, but that a further increase in the amount of the aminoethyl ethanolamine to 5.9 parts, by weight, does not further increase the effectiveness of the composition.

TABLE IV

*Comparative algicidal tests against Scenedesmus quadricauda at concentrations of 2 p.p.m. of the active algicidal ingredients of the composition*

| Example No. | 18 | 19 | 20 | 21 |
|---|---|---|---|---|
| Composition in Percent by Weight: | | | | |
| Commercial Algicide A | 100 | | | |
| Cetyl mixed picolinium bromide | | 64.3 | 55.4 | 48.0 |
| Aminoethyl ethanolamine | | 3.6 | 3.1 | 3.0 |
| Isopropanol | | 21.4 | 18.5 | 11.0 |
| Methyl isobutyl ketone | | | 13.8 | |
| Diethylene glycol | | | | 18.0 |
| Water | | 10.7 | 9.2 | 20.0 |
| Algicidal Test: Number of days of Complete Control | 11 | 35 | 22 | 29.0 |

As shown by the data of Table IV, the composition in accordance with this invention (Example 19) is more than three times as effective as the commercial "Algicide A" in the control of the algae *Scenedesmus quadricauda* at concentrations of 2 p.p.m.

TABLE V

*Comparative algicidal tests of representative compositions of this invention against a series of four different algae, at concentrations of 2 p.p.m. of active ingredient*

| Example No. | 20 | 21 | 22 | 23 | 24 | 25 |
|---|---|---|---|---|---|---|
| Composition in Percent by Weight: | | | | | | |
| Cetyl mixed picolinium bromide | 62.8 | | 61.25 | 62.5 | | 62.2 |
| Cetyl γ-picolinium bromide | | 64.2 | | | 50.7 | |
| 2,6-lutidine and other heterocyclic amines or amine hydrobromides | 13.0 | 5.6 | 7.15 | 7.15 | 4.5 | 12.7 |
| Aminoethyl ethanolamine | 2.4 | 3.0 | 3.4 | 3.05 | | |
| Hexamethylene tetramine | | | | | 4.5 | 2.4 |
| Pine Oil | | | 1.0 | 1.05 | 0.3 | 1.1 |
| Isopropanol | 17.0 | 21.2 | 18.3 | 18.3 | 20.00 | 10.8 |
| Diethylene glycol | | | 13.7 | 1.5 | | |
| Water | 4.8 | 6.0 | 4.6 | 7.6 | 20.0 | 10.8 |
| Algicidal test against the designated species at 2 p.p.m. of active ingredients, shown as days of complete control: | | | | | | |
| Nostoc sp. | 30 | 18 | 25 | 30 | 30 | 16 |
| Scenedesmus obliqus | 30 | 30 | 30 | 30 | 30 | 30 |
| Scenedesmus quadricauda | 30 | 30 | 30 | 30 | 30 | 30 |
| Chlorella variegata | 31 | 31 | 31 | 31 | 31 | 31 |

The "2,6-lutidine and other hetrocyclic amines or amine hydrobromides" shown by Table V are unreacted products or by-products which are present in the cetyl mixed picolinium bromide or the cetyl γ-picolinium bromide, as the case may be. The mixture of materials involved themselves show algicidal activity making unnecessary the complete purification of the cetyl mixed picolinium bromide or the cetyl γ-picolinium bromide to render them suitable for use in our compositions.

Referring specifically to the data of Table V it will be seen that the compositions in accordance with this invention in a variety of different formulations were highly effective against each of the four species of algae against which they were tested, hexamethylene tetramine generally showed about as strong a synergistic action (Examples 24 and 25) as was shown by aminoethyl ethanolamine (Examples 20–23).

It is to be noted that two parts per million of the active ingredients were added to water in each of the foregoing examples. In the case of the compositions of this invention both the quaternary nitrogen compound and the organic polyamine were considered active ingredients. From the test results presented by the examples, it is to be noted that the concentration of two parts per million gave effective control of the algae. However, the amount of the composition added to water may be varied to give a concentration, by weight, of the active ingredients in the water within the range of about 0.5 p.p.m. to about 5 p.p.m. Higher concentrations than 5.0 p.p.m. may be used but are generally unnecessary to effectively destroy algae growths and are undesirable from an economic standpoint.

The compositions in accordance with this may be added to the water of a swimming pool without interrupting the use of the pool. The compositions at the concentrations required for the destruction of algae growths have no adverse effects on the swimmers, and their presence in the water is unnoticeable.

In the foregoing we have given numerous details as to the algicidal compositions in accordance with this invention and as to the various materials which may be included in the composition along with the essential quaternary nitrogen compound and the organic polyamine, of the classes described. For example, Table I illustrates formulations in which the synergistic combination of active algicidal ingredients form at least 49%, by weight, of the compositions. Should it be desired to produce a composition containing, for example, 10% by weight of the active algicidal ingredients, it is necessary merely to add an appropriate amount of water to the particular formulation involved. On the other hand, the composition may be a solid binary mixture of the quaternary nitrogen compound and the organic polyamine. It will be fully understood that the details we have given have been for the purpose of fully illustrating and describing our invention and that many substitutions and variations can be made in the formulations of these algicidal compositions without departing from the spirit of our invention or the scope of the claims which follow.

We claim:

1. An algicidal composition comprising as an ingredient the synergistic combination of about 1.0 to about 18 parts, by weight, of aminoethyl ethanolamine and about 48 to about 67 parts, by weight, of cetyl picolinium bromide, about 10 parts, by weight, to about 35 parts, by weight, of isopropanol, about 1.0 part, by weight, to about 18.0 parts, by weight, of diethylene glycol and about 1.0 part, by weight, to about 25 parts, by weight, of water.

2. An algicidal composition comprising:
(a) as an essential ingredient the combination of an organic polyamine which has at least two and not more than eight carbon atoms and at least two and not more than five nitrogen atoms in its molecule and of a water-soluble quaternary nitrogen compound which when in solution in water produces a cation having the following formula:

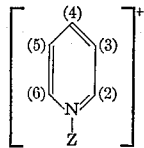

in which (2), (3), (4), (5) and (6), respectively, are each selected from the group consisting of a hydrogen atom and lower alkyl groups containing not more than four carbon atoms, and Z is selected from the group consisting of saturated and unsaturated hydrocarbon aliphatic groups having at least fourteen and not more than twenty carbon atoms; the said organic polyamine being present in said combination in an amount of at least about 1.5 percent by weight and not more than about 17.2 percent by weight.

3. An algicidal composition comprising:
(a) as an essential ingredient the combination of an organic polyamine which has at least two and not more than eight carbon atoms and at least two and not more than five nitrogen atoms in its molecule, and of a water-soluble quaternary nitrogen compound which when in solution in water produces a cation having the following formula:

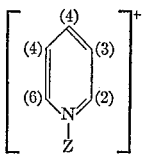

in which (2), (3), (4), (5) and (6), respectively, are each selected from the group consisting of a hydrogen atom and lower alkyl groups containing not more than four carbon atoms, and Z is selected from the group consisting of saturated and unsaturated hydrocarbon aliphatic groups having at least fourteen and not more than twenty carbon atoms; the said organic polyamine being present in said combination in an amount of at least about 1.5 percent by weight and not more than about 17.2 percent by weight; and
(b) a monohydric alcohol containing not more than six carbon atoms.

4. An algicidal composition comprising:
(a) as an essential ingredient the combination of an organic polyamine which has at least two and not more than eight carbon atoms and at least two and not more than five nitrogen atoms in its molecule, and of a water-soluble quaternary nitrogen compound which when in solution in water produces a cation having the following formula:

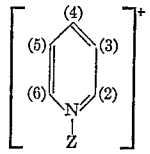

in which (2), (3), (4), (5) and (6), respectively, are each selected from the group consisting of a hydrogen atom and lower alkyl groups containing not more than four carbon atoms, and Z is selected from the group consisting of saturated and unsaturated hydrocarbon aliphatic groups having at least fourteen and not more than twenty carbon atoms; the said organic polyamine being present in said combination in an amount of at least about 1.5 percent by weight and not more than about 17.2 percent by weight;

(b) a monohydric alcohol containing not more than six carbon atoms; and
(c) a liquid polyhydric alcohol.

5. An algicidal composition comprising:
(a) as an essential ingredient the combination of an organic polyamine which has at least two and not more than eight carbon atoms and which has at least two and not more than five nitrogen atoms in its molecule and of a water-soluble quaternary nitrogen compound which when in water produces a cation having the following formula:

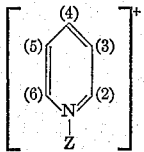

in which (2), (3), (4), (5) and (6), respectively, are each selected from the group consisting of a hydrogen atom and lower alkyl groups containing not more than four carbon atoms, and Z is selected from the group consisting of saturated and unsaturated hydrocarbon aliphatic groups having at least fourteen and not more than twenty carbon atoms; the said organic polyamine being present in said combination in an amount of at least about 1.5 percent by weight and not more than about 17.2 percent by weight;
(b) a monohydric alcohol containing not more than six carbon atoms; and
(c) a liquid polyhydric alcohol and water.

6. An algicidal composition comprising:
(a) as an essential ingredient the combination of an organic polyamine which has at least two and not more than eight carbon atoms in its molecule and cetyl picolinium halide; the said organic polyamine being present in said combination in an amount of at least about 1.5 percent by weight and not more than about 17.2 percent by weight.

7. An algicidal composition comprising:
(a) as an essential ingredient the combination of an organic polyamine which has at least two and not more than eight carbon atoms in its molecule and cetyl picolinium chloride; the said organic polyamine being present in said combination in an amount of at least about 1.5 percent by weight and not more than about 17.2 percent by weight.

8. An algicidal composition comprising:
(a) as an essential ingredient the combination of an organic polyamine which has at least two and not more than eight carbon atoms in its molecule and cetyl picolinium bromide; the said organic polyamine being present in said combination in an amount of at least about 1.5 percent by weight and not more than about 17.2 percent by weight.

9. An algicidal composition comprising:
(a) as an essential ingredient the combination of aminoethyl ethanolamine and cetyl picolinium halide; in said combination the said aminoethyl ethanolamine being present in an amount of at least about 1.5 percent by weight and not more than about 17.2 percent by weight.

10. An algicidal composition comprising:
(a) as an essential ingredient the combination of hexamethyl tetramine and cetyl picolinium halide; in said combination the said hexamethyl tetramine being present in an amount of at least about 1.5 percent by weight and not more than about 17.2 percent by weight.

11. An algicidal composition comprising:
(a) as an essential ingredient the combination of hexamethylene tetramine and cetyl picolinium halide; in said combination the said hexamethylene tetramine being present in an amount of at least about 1.5 percent by weight and not more than about 17.2 percent by weight.

12. An algicidal composition comprising:
(a) as an essential ingredient the combination of propane diamine and cetyl picolinium halide; in said combination the said propane diamine being present in an amount of at least about 1.5 percent by weight and not more than about 17.2 percent by weight.

13. An algicidal composition comprising:
(a) as an essential ingredient the combination of diethylene triamine and cetyl picolinium halide; in said combination the said diethylene triamine being present in an amount of at least about 1.5 percent by weight and not more than about 17.2 percent by weight.

14. An algicidal composition comprising:
(a) as an essential ingredient the combination of tetraethylene pentamine and cetyl picolinium halide; in said combination the said tetraethylene pentamine being present in an amount of at least about 1.5 percent by weight and not more than about 17.2 percent by weight.

15. An algicidal composition comprising:
(a) as an essential ingredient the combination of aminoethyl ethanolamine and cetyl picolinium halide; in said combination the said aminoethyl ethanolamine being present in an amount of at least about 1.5 percent by weight and not more than about 17.2 percent by weight; and
(b) isopropanol.

16. An algicidal composition comprising:
(a) as an essential ingredient the combination of aminoethyl ethanolamine and cetyl picolinium halide; in said combination the said aminoethyl ethanolamine being present in an amount of at least about 1.5 percent by weight and not more than about 17.2 percent by weight;
(b) isopropanol; and
(c) diethylene glycol.

17. An algicidal composition comprising:
(a) as an essential ingredient the combination of aminoethyl ethanolamine and cetyl picolinium halide; in said combination the said aminoethyl ethanolamine being present in an amount of at least about 1.5 percent by weight and not more than about 17.2 percent by weight;
(b) isopropanol;
(c) ethylene glycol; and
(d) water.

References Cited in the file of this patent

UNITED STATES PATENTS

| | | |
|---|---|---|
| 1,968,341 | Hartmann et al. | July 31, 1934 |
| 2,019,121 | De Rewal | Oct. 29, 1935 |
| 2,666,010 | Stayner | Jan. 12, 1954 |
| 2,881,070 | Pera | Apr. 7, 1959 |
| 3,024,190 | Bennett et al. | Mar. 6, 1962 |

FOREIGN PATENTS

| | | |
|---|---|---|
| 521,310 | Canada | Jan. 31, 1956 |